(12) United States Patent
Yezerets et al.

(10) Patent No.: US 9,683,507 B2
(45) Date of Patent: Jun. 20, 2017

(54) SYSTEM, METHOD, AND APPARATUS FOR CONTROLLING AN AFTERTREATMENT SYSTEM HAVING A PARTICULATE FILTER AND A RICH $NO_x$ CONVERSION DEVICE

(71) Applicant: Cummins Inc., Columbus, IN (US)

(72) Inventors: Aleksey Yezerets, Columbus, IN (US); Timothy R. Frazier, Columbus, IN (US); Marten H. Dane, Columbus, IN (US); Samuel C. Geckler, Columbus, IN (US); Govindarajan Kothandaraman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 244 days.

(21) Appl. No.: 14/263,106

(22) Filed: Apr. 28, 2014

(65) Prior Publication Data

US 2014/0230413 A1     Aug. 21, 2014

Related U.S. Application Data

(62) Division of application No. 13/045,208, filed on Mar. 10, 2011, now Pat. No. 8,745,971.
(Continued)

(51) Int. Cl.
*F01N 3/00*     (2006.01)
*F02D 41/14*    (2006.01)
(Continued)

(52) U.S. Cl.
CPC ......... *F02D 41/1454* (2013.01); *F01N 3/035* (2013.01); *F01N 3/101* (2013.01);
(Continued)

(58) Field of Classification Search
USPC .......................................................... 60/295
See application file for complete search history.

(56) References Cited

U.S. PATENT DOCUMENTS

| 6,742,329 B2 | 6/2004 | Miura et al. |
| 6,945,036 B2 | 9/2005 | Kato et al. |

(Continued)

FOREIGN PATENT DOCUMENTS

| EP | 1 234 961 | 8/2002 |
| EP | 1 541 219 | 6/2005 |

(Continued)

OTHER PUBLICATIONS

Zhan, R., Eakle, S. and Weber, P. "Simultaneous Reduction of PM, HC, CO and NOx Emissions from a GDI Engine," SAE Technical Paper Jan. 2010, 0365, 2010, Apr. 12, 2010.

*Primary Examiner* — Jason Shanske
(74) *Attorney, Agent, or Firm* — Taft Stettinius & Hollister LLP

(57) ABSTRACT

A system includes an internal combustion ignition engine with an exhaust gas flow, a particulate filter in the exhaust gas flow, a $NO_x$ reduction catalyst in the exhaust gas flow downstream of the particulate filter, a first oxygen sensor coupled to the exhaust gas flow downstream of the $NO_x$ reduction catalyst, and a second oxygen sensor coupled to the exhaust gas flow between the particulate filter and the $NO_x$ reduction catalyst. A controller includes an exhaust conditions module that interprets a first oxygen signal from the first oxygen sensor and a second oxygen signal from the second oxygen sensor and a combustion control module that commands a high engine-out air-fuel ratio when the first oxygen signal indicates a low oxygen content and commands a low engine-out air-fuel ratio when the first oxygen signal indicates a high oxygen content.

12 Claims, 5 Drawing Sheets

Related U.S. Application Data

(60) Provisional application No. 61/312,884, filed on Mar. 11, 2010.

(51) Int. Cl.
    *F01N 3/035*     (2006.01)
    *F01N 3/10*     (2006.01)
    *F01N 9/00*     (2006.01)
    *F01N 11/00*     (2006.01)
    *F02D 41/02*     (2006.01)

(52) U.S. Cl.
    CPC ............ *F01N 9/002* (2013.01); *F01N 11/005* (2013.01); *F01N 11/007* (2013.01); *F02D 41/029* (2013.01); *F02D 41/1408* (2013.01); *F02D 41/1441* (2013.01); *F01N 2550/04* (2013.01); *F01N 2560/025* (2013.01); *F01N 2900/0416* (2013.01); *F01N 2900/1602* (2013.01); *F01N 2900/1606* (2013.01); *F02D 41/146* (2013.01); *F02D 2200/0802* (2013.01); *F02D 2200/0812* (2013.01); *Y02T 10/22* (2013.01); *Y02T 10/24* (2013.01); *Y02T 10/47* (2013.01)

(56) References Cited

U.S. PATENT DOCUMENTS

| | | | |
|---|---|---|---|
| 6,988,361 | B2 | 1/2006 | van Nieuwstadt et al. |
| 7,137,246 | B2 | 11/2006 | van Nieuwstadt et al. |
| 7,225,613 | B2 | 6/2007 | Hammerle et al. |
| 7,478,553 | B2 | 1/2009 | Higuchi |
| 7,610,753 | B2 | 11/2009 | Kitahara |
| 2005/0072141 | A1 | 4/2005 | Kitahara |
| 2007/0125075 | A1* | 6/2007 | Zanini-Fisher ......... F01N 11/00 60/297 |
| 2008/0288157 | A1 | 11/2008 | Winsor et al. |
| 2009/0087365 | A1 | 4/2009 | Klingmann et al. |
| 2010/0089034 | A1 | 4/2010 | Harmsen |
| 2010/0192543 | A1 | 8/2010 | Fujiwara et al. |
| 2011/0072783 | A1* | 3/2011 | Hepburn ................. F01N 3/023 60/274 |
| 2011/0072802 | A1 | 3/2011 | Bidner et al. |

FOREIGN PATENT DOCUMENTS

| | | |
|---|---|---|
| EP | 2 000 653 | 12/2008 |
| EP | 2 063 090 | 5/2009 |
| WO | 2009085664 | 7/2009 |

* cited by examiner

SYSTEM, METHOD, AND APPARATUS FOR CONTROLLING AN AFTERTREATMENT SYSTEM HAVING A PARTICULATE FILTER AND A RICH NO$_x$ CONVERSION DEVICE

RELATED APPLICATIONS

This application is a divisional of U.S. patent application Ser. No. 13/045,208 filed Mar. 10, 2011, which claims the benefit of the filing date of U.S. Provisional Patent Application 61/312,884 filed on Mar. 11, 2010, each of which is incorporated herein by reference for all purposes.

BACKGROUND

The present application relates to operating an internal combustion engine at or near stoichiometric conditions, and further relates to regenerating an aftertreatment system and other challenges related thereto. The engine may be a spark ignited or compression ignition engine. Aftertreatment systems are required to bring emissions into compliance for many engine applications, and many aftertreatment systems require accurate control of air-fuel ratios to properly function and to regenerate. Further, regeneration of some aftertreatment system components in the absence of excess oxygen can be challenging. Accordingly, there is a demand for further improvements in this area of technology.

In other examples, the present application relates to controlling an aftertreatment system having a particulate filter and a NO$_x$ conversion device that converts NO$_x$ under rich or stoichiometric conditions. Many particulate filters require excess oxygen to properly oxidize and remove trapped particulates. NO$_x$ conversion devices that are not designed for lean operation have limited NO$_x$ conversion when oxygen levels are significantly higher than stoichiometric oxygen levels. Accordingly, operational challenges are presented in an aftertreatment system including a particulate filter and a NO$_x$ conversion device that is not designed for lean operation.

SUMMARY

One embodiment is a unique method to control an aftertreatment device having a particulate filter upstream of a rich NO$_x$ conversion device. Further embodiments, forms, objects, features, advantages, aspects, and benefits shall become apparent from the following description and drawings.

DESCRIPTION OF THE ILLUSTRATIVE EMBODIMENTS

Figure 1:
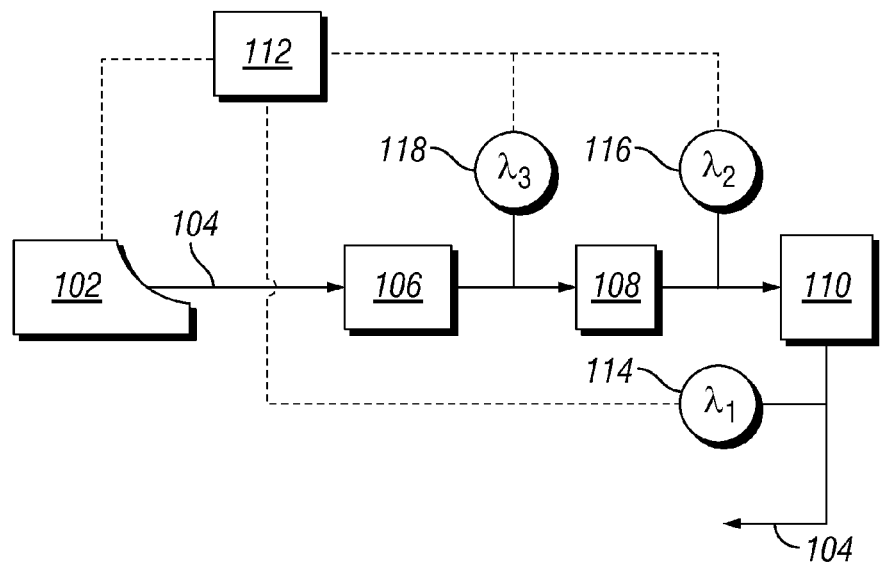
FIG. 1 is a schematic diagram of a system for operating a compression ignition engine at stoichiometric conditions.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected.

FIG. 1 is a schematic diagram of a system 100 for operating a compression ignition engine at stoichiometric conditions. The system 100 includes an internal combustion ignition engine 102 that is designed to operate at stoichiometric conditions during at least portions of the engine 102 operating period. An exemplary engine 102 is a compression ignition engine which may be a turbocharged diesel engine, but may also be a direct injected gasoline engine or any other engine operating as a compression ignition engine. The exemplary system includes an oxidation catalyst 106, a particulate filter 108, and a NO$_x$ reduction catalyst 110. The NO$_x$ reduction catalyst 110 may be any NO$_x$ reduction catalyst known in the art that operates at stoichiometric conditions during at least a portion of the operating conditions of the catalyst, for example the NO$_x$ reduction catalyst 110 may be a three-way catalyst. The oxidation catalyst 106 may not be present in certain embodiments. The particulate filter 108 traps a fraction of the particulates in the exhaust flow 104, and the trapped particulates are continuously or periodically oxidized on the particulate filter 108. The particulate filter 108 may be catalyzed or un-catalyzed, and may be a wall flow filter or a flow-through filter.

The system 100 further includes a first oxygen sensor 114 operationally coupled to the exhaust flow 104 at a position downstream of the NO$_x$ reduction catalyst 110. The system 100 further includes a second oxygen sensor 116 operationally coupled to the exhaust flow 104 at a position downstream of the particulate filter 108 and upstream of the NO$_x$ reduction catalyst 110. The system 100 further includes a third oxygen sensor 118 upstream of the particulate filter 108. The third oxygen sensor 118 may also be positioned upstream of the oxidation catalyst 106, and in certain embodiments the third oxygen sensor 118 may not be present or may be a virtual sensor calculated from other parameters in the system 100. Each oxygen sensor 114, 116, 118 may be a lambda sensor, i.e. a sensor that detects an air-fuel ratio in the exhaust flow 104 and especially detects whether the exhaust flow 104 is relatively rich or relatively lean at the position of the sensor 114, 116, 118. In certain embodiments, a narrow band or "switching" lambda sensor may be utilized for one or more of the oxygen sensors 114, 116, 118, however a wide range lambda sensor is a preferred sensor and is utilized in certain embodiments to support certain features described herein, as will be understood to one of skill in the art. Additionally, any oxygen sensor 114, 116, 118 may be a true oxygen sensor (i.e. that determines the actual oxygen mole fraction or mass fraction in the exhaust flow 104) or a $NO_x$ sensor that also determines the oxygen fraction.

The system 100 further includes a controller 112 that receives signals from the oxygen sensors 114, 116, 118. The controller 112 communicates with any portion of the system 100, including an engine controller (not shown) and any sensors or actuators (not shown) to implement the functions of the controller 112 as described herein. The controller 112 may be part of a processing subsystem, and includes an electronic processor and memory of any known type, where the memory stores a computer program, run-time variables, and information that is saved after the controller 112 is powered down. The controller 112 may be a single computer and/or part of a distributed computing subsystem, where different computers communicate through datalinks, networks, wireless communications, and the like. The controller 112 may be included with an engine controller (not shown). Certain aspects of the controller 112 may be implemented in hardware as well as software, for example and without limitation a voltage parameter may be converted in hardware before being processed by the controller 112. Actuation by the controller 112 may occur by any method understood in the art, including at least electronic, datalink commands to a smart device or secondary controller, pneumatic, and/or hydraulic actuation.

Figure 3:
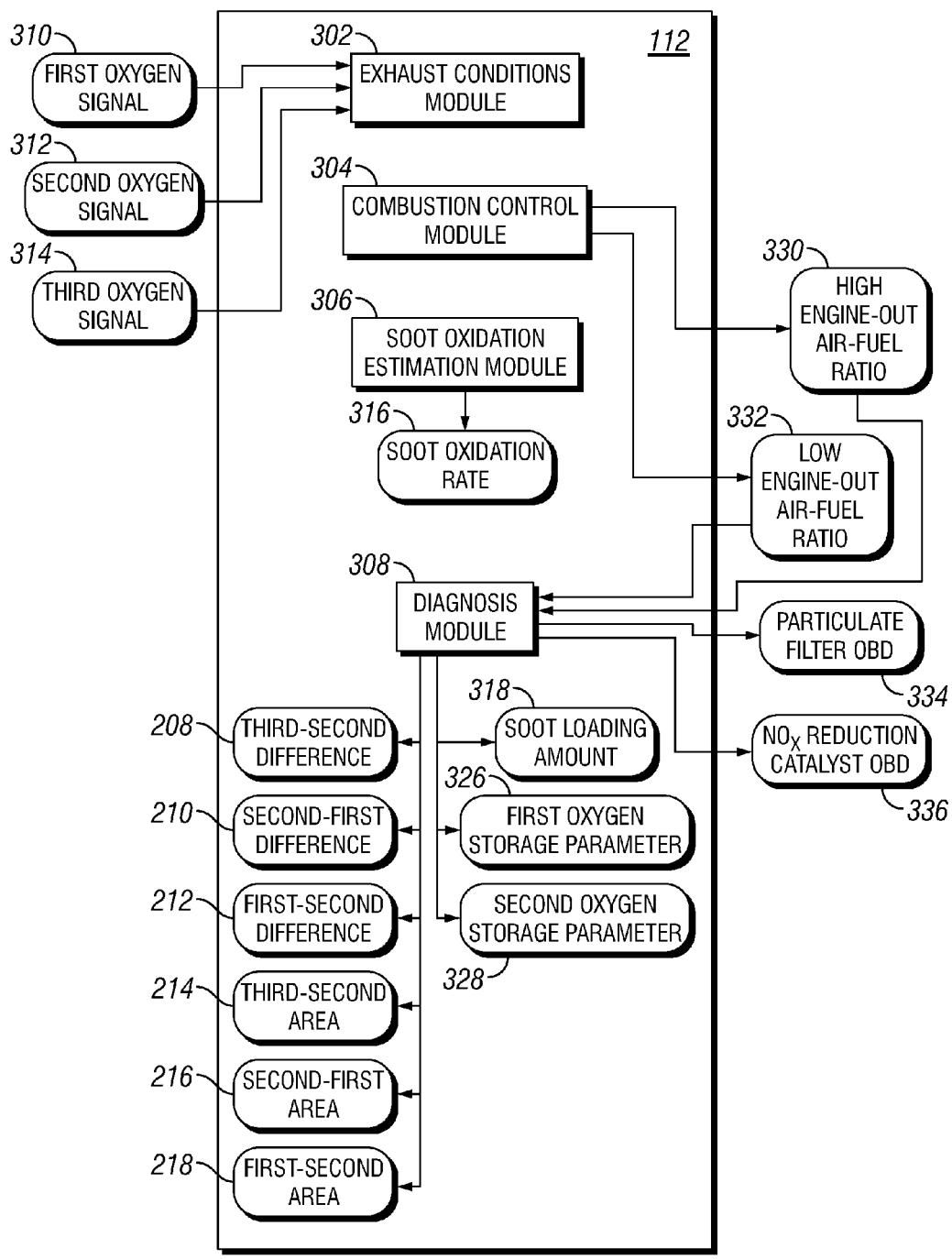
FIG. 3 is a schematic diagram of a controller that functionally executes certain operations for operating a compression ignition engine at stoichiometric conditions.

Referencing FIG. 3, a schematic diagram of a controller 112 that functionally executes certain operations for operating a compression ignition engine at stoichiometric conditions is illustrated. The controller 112 includes modules that functionally execute the operations of the controller 112. The use of modules in the description emphasizes the functional independence of the operations of the controller 112, and the modules selected illustrate one potential organization for the operations of the controller 112. Some or all of the functions performed by any module may be combined with the functions performed by other modules, and some of the functions performed by any module may be divided. A module may be a software element (e.g. as a function or sub-routine) on a single controller, and/or may be divided among a plurality of controllers. Some of the operations of a module may be implemented in hardware rather than software. Certain modules may not be present in certain embodiments of the system 100.

The controller 112 depicted in FIG. 3 includes an exhaust conditions module 302, a combustion control module 304, a soot oxidation estimation module 306, and a diagnosis module 308. The exhaust conditions module 302 interprets a first oxygen signal 310, a second oxygen signal 312, and may further interpret a third oxygen signal 314. Interpreting a signal includes reading the signal directly from a sensor 114, 116, 118, reading a value from a sensor and converting the value to an oxygen description, reading a software parameter having a value describing the oxygen signal 310, 312, 314, and/or receiving one or more of the oxygen signals 310, 312, 314 from a datalink or network.

The controller 112 further includes a combustion control module 304 that commands a high engine-out air-fuel ratio 330 in response to the first oxygen signal 310 indicating a low oxygen content out of the $NO_x$ reduction catalyst 110. The combustion control module 304 commands a low engine-out air-fuel ratio 332 in response to the first oxygen signal 310 indicating a high oxygen content out of the $NO_x$ reduction catalyst 110. The commanding of the high engine-out air-fuel ratio 330 and/or the low engine-out air-fuel ratio 332 may occur after a delay period, and may occur in response to a switching of the first oxygen signal 310, for example from a low oxygen content to a high oxygen content. In one example, the combustion control module 304 waits a first predetermined period of time before commanding the high engine-out air-fuel ratio 330 after the first oxygen signal 310 switches to indicating a low oxygen content, and the combustion control module 304 waits a second predetermined period of time before commanding the low engine-out air-fuel ratio 332 after the first oxygen signal switches to indicating a high oxygen content. The first and second predetermined time periods may be selected to de-bounce the first and second oxygen signals 310, 312, to ensure that certain intermittent system dynamics do not prematurely trigger a switch (e.g. a gear change by a vehicle operator triggering an unplanned rich or lean slug through the exhaust flow 104), to prevent wear on components due to rapid switching of operating modes, or to support any other purposes understood in the art.

The high engine-out air-fuel ratio 330 includes, in certain embodiments, an air-fuel ratio that provides an amount of excess oxygen available for soot oxidation on the particulate filter 108. The high engine-out air-fuel ratio 330 includes a lambda value between about 1.02 and about 1.15, and includes a lambda of about 1.10 in certain embodiments. The high engine-out air-fuel ratio 330 includes an oxygen fraction between about 0.25% and about 9% in certain embodiments. In one example, the combustion control module 304 commands the high engine-out air-fuel ratio 330 by commanding the engine 102 to operate at a combustion air-fuel ratio between about 14.9 to about 16.3, or from about 14.9 to about 18. The described air-fuel ratio ranges may vary according to the fuel formulation used in the system 100, as will be known to one of skill in the art. The described ranges are for a system 100 having a stoichiometric air-fuel ratio of about 14.8. The combustion control module 304 may utilize the described ranges in controlling engine combustion operation, or may select specific values within the ranges.

In one example, the combustion control module 304 commands the high engine-out air-fuel ratio 330 by initially commanding about 10% excess oxygen during combustion (i.e. lambda 1.10 at the third oxygen sensor 118 location, and/or combustion air-fuel ratio around 16.3), and utilizes the second oxygen signal 312 as a feedback parameter, targeting the exhaust flow 104 to have a lambda at stoichiometric conditions (e.g. between about 0.99 and 1.01) at the location of the second oxygen sensor 116. The combustion control module 304 may utilize a proportional-integral, proportional-integral-derivative, fuzzy logic, neural network, or any other known control scheme to manipulate the combustion air-fuel ratio until the target air-fuel ratio at the location of the second oxygen sensor 116 is achieved.

The low engine-out air-fuel ratio 332 includes, in certain embodiments, an air-fuel ratio that provides a slightly rich condition the particulate filter 108. The low engine-out air-fuel ratio 332 includes a lambda value between about 0.95 and about 1.00, and includes a lambda of about 0.98 in certain embodiments. In one example, the combustion control module 304 commands the low engine-out air-fuel ratio 332 by commanding the engine 102 to operate at a combustion air-fuel ratio between about 13.9 to about 14.7, or from about 14.4 to about 14.7. The described air-fuel ratio ranges may vary according to the fuel formulation used in the system 100, as will be known to one of skill in the art. The described ranges are for a system 100 having a stoichiometric air-fuel ratio of about 14.8. The combustion control module 304 may utilize the described ranges in controlling engine combustion operation, or may select specific values within the ranges.

In one example, the combustion control module 304 commands the low engine-out air-fuel ratio 332 by initially commanding about 2% oxygen shortage during combustion (i.e. lambda 0.98 at the third oxygen sensor 118 location, and/or combustion air-fuel ratio around 14.4), and utilizes the second oxygen signal 312 as a feedback parameter, targeting the exhaust flow 104 to have a lambda at stoichiometric conditions (e.g. between about 0.99 and 1.01) at the location of the second oxygen sensor 116. The combustion control module 304 may utilize a proportional-integral, proportional-integral-derivative, fuzzy logic, neural network, or any other known control scheme to manipulate the combustion air-fuel ratio until the target air-fuel ratio at the location of the second oxygen sensor 116 is achieved.

The third oxygen signal 314 may further be utilized by the combustion control module 304 as a feedback parameter for controlling the engine-out air-fuel ratio. For example, the combustion control module 304 may command parameters (fuel rate, turbocharger flow rate and/or position, exhaust gas recirculation flow rates, etc.) to achieve a specified air-fuel ratio, and utilize the third oxygen signal 314 to determine whether the specified air-fuel ratio is achieved. The combustion control module 304 may utilize a proportional-integral, proportional-integral-derivative, fuzzy logic, neural network, or any other known control scheme to manipulate the combustion parameters until the specified air-fuel ratio at the location of the third oxygen sensor 118 is achieved.

The controller 112 further includes a soot oxidation estimation module 306 that determines a soot oxidation rate 316 in the particulate filter 108. The combustion control module 304 may further command the combustion air-fuel ratio in response to the soot oxidation rate 316. In one example, the combustion control module 304 limits oxygen to avoid exceeding a designed maximum soot oxidation rate 316. The soot oxidation estimation module 306 may determine the soot oxidation rate 316 by determining a second-third oxygen signal difference 208. Referencing FIG. 2, the difference 208 between a third oxygen signal curve 206 and a second oxygen signal curve 204 is related to the soot oxidation rate 316 on the particulate filter 108 at a specific time.

The controller 112 further includes a diagnosis module 308. In certain embodiments, the diagnosis module determines a soot loading amount 318 on the particulate filter 108. In one example, the diagnosis module 308 determines the soot loading amount 318 in response to the difference 208 between a third oxygen signal curve 206 and a second oxygen signal curve 204, for example a highest difference 208 observed during a high engine-out air-fuel ratio 330 event and/or an average difference 208 observed during the high engine-out air-fuel ratio 330 event. In another example, the diagnosis module 308 determines the soot loading amount 318 in response to an area 214 between the third oxygen signal curve 206 and a second oxygen signal curve 204 during the high engine-out air-fuel ratio 330 event. The soot loading amount 318 can be published to the system 100, utilized in various diagnostics (e.g. to determine whether ongoing soot regeneration is successful), utilized to calibrate a soot oxidation model, or for any other purpose understood in the art. In certain embodiments, the soot oxidation rate 316 and/or soot loading amount 318 are utilized in performing a particulate filter on-board diagnostics (OBD) 334 test.

In certain embodiments, the diagnosis module 308 determines a first oxygen storage parameter 326 in response to the difference 210 between a second oxygen signal curve 204 and a first oxygen signal curve 202, for example a highest difference 210 observed during a high engine-out air-fuel ratio 330 event and/or an average difference 210 observed during the high engine-out air-fuel ratio 330 event. In another example, the diagnosis module 308 determines the first oxygen storage parameter 326 in response to an area 216 between the second oxygen signal curve 204 and the first oxygen signal curve 202 during the high engine-out air-fuel ratio 330 event. The first oxygen storage parameter 326 can be published to the system 100, utilized in various diagnostics (e.g. to determine whether the $NO_x$ reduction catalyst 110 remains effective), utilized to calibrate $NO_x$ reduction catalyst degradation model, or for any other purpose understood in the art. In certain embodiments, the first oxygen storage parameter 326 is utilized in performing a $NO_x$ reduction catalyst OBD 336 test.

In certain embodiments, the diagnosis module 308 determines a second oxygen storage parameter 328 in response to the difference 212 between a first oxygen signal curve 202 and a second oxygen signal curve 204, for example a highest difference 212 observed during a low engine-out air-fuel ratio 332 event and/or an average difference 212 observed during the low engine-out air-fuel ratio 332 event. In another example, the diagnosis module 308 determines the second oxygen storage parameter 328 in response to an area 218 between first oxygen signal curve 202 and a second oxygen signal curve 204 during the low engine-out air-fuel ratio 332 event. The second oxygen storage parameter 328 can be published to the system 100, utilized in various diagnostics (e.g. to determine whether the $NO_x$ reduction catalyst 110 remains effective), utilized to calibrate $NO_x$ reduction catalyst degradation model, or for any other purpose understood in the art. In certain embodiments, the first oxygen storage parameter 326 is utilized in performing a $NO_x$ reduction catalyst OBD 336 test.

Figure 2:
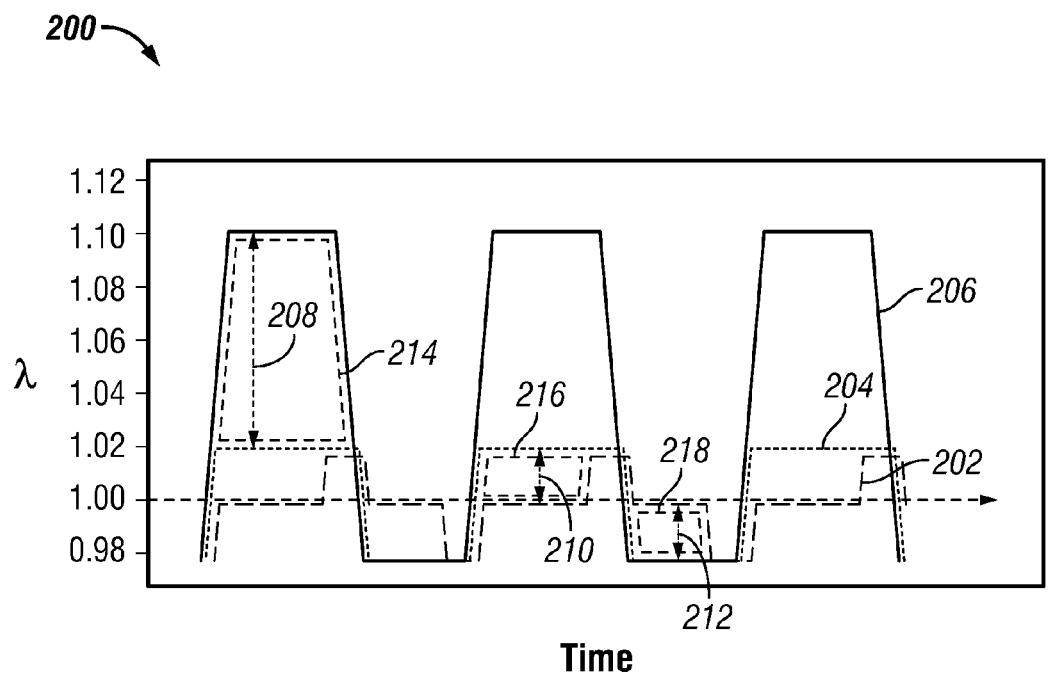
FIG. 2 is an illustration of air-fuel ratios at various times during operation of a compression ignition engine at stoichiometric conditions.

Referencing FIG. 2, three oxygen signal curves 202, 204, 206 are plotted illustrating a typical time segment of operation for the system 100. At an early time, the first curve 202, indicating oxygen content in the exhaust flow 104 downstream of the $NO_x$ reduction catalyst 110, indicates a low oxygen content, and in response the combustion control module 304 commands a high engine-out air-fuel ratio 330. The third oxygen curve 206 responds indicating a high oxygen content in the exhaust flow 104 upstream of the particulate filter 108. The second oxygen curve 204 indicates a reduced oxygen content relative to the third oxygen curve 206 due to soot oxidation on the particulate filter 108, but the second oxygen curve 204 is still slightly lean ($\lambda$=1.02) but near stoichiometric conditions. For a period of time after the third oxygen curve 206 is raised, the first oxygen curve 202 is held near stoichiometric as the $NO_x$ reduction catalyst stores oxygen. At a later point in time, oxygen breakthrough occurs and the first oxygen curve 202 raises to approximately the same level as the second oxygen curve 204. The combustion control module 304 may respond to the rise in the first oxygen curve 202 by commanding the low engine-out air-fuel ratio 332 as shown in the illustration of FIG. 2. Alternatively, the combustion control module 304 may continue with a high engine-out air-fuel ratio 330 until the soot on the particulate filter 108 is consumed (which may be indicated by a rise in the second oxygen curve 204), although as the soot is consumed the combustion control module 304 may lower the high engine-out air-fuel ratio 330 from a nominal value to a lower but still lean value—for example something lower than the $\lambda$=1.10 illustrated in FIG. 2.

After the third oxygen curve 206 reaches the lower oxygen content in response to the low engine-out air-fuel ratio 332 (e.g. λ=0.98 in the illustration), the second oxygen curve 204 also reaches the lower oxygen content value. In certain embodiments, some soot combustion may occur even at slightly rich conditions, which may cause the second oxygen curve 204 to not exactly follow the third oxygen curve 206, although this difference is not important. The first oxygen curve 202 is maintained at or near stoichiometric conditions for a period of time after the combustion control module 304 commands the low engine-out air-fuel ratio 332 because the $NO_x$ reduction catalyst 110 has some stored oxygen which is released maintaining stoichiometric conditions for a period. The first oxygen curve 202 eventually drops as the stored oxygen is depleted to about the level of the second oxygen curve 204. In response to the low third oxygen signal 314, the combustion control module 304 returns to the high engine-out air-fuel ratio 330. Operations described in reference to FIG. 2 are for illustration only, and are not intended to be limiting.

Figure 4:
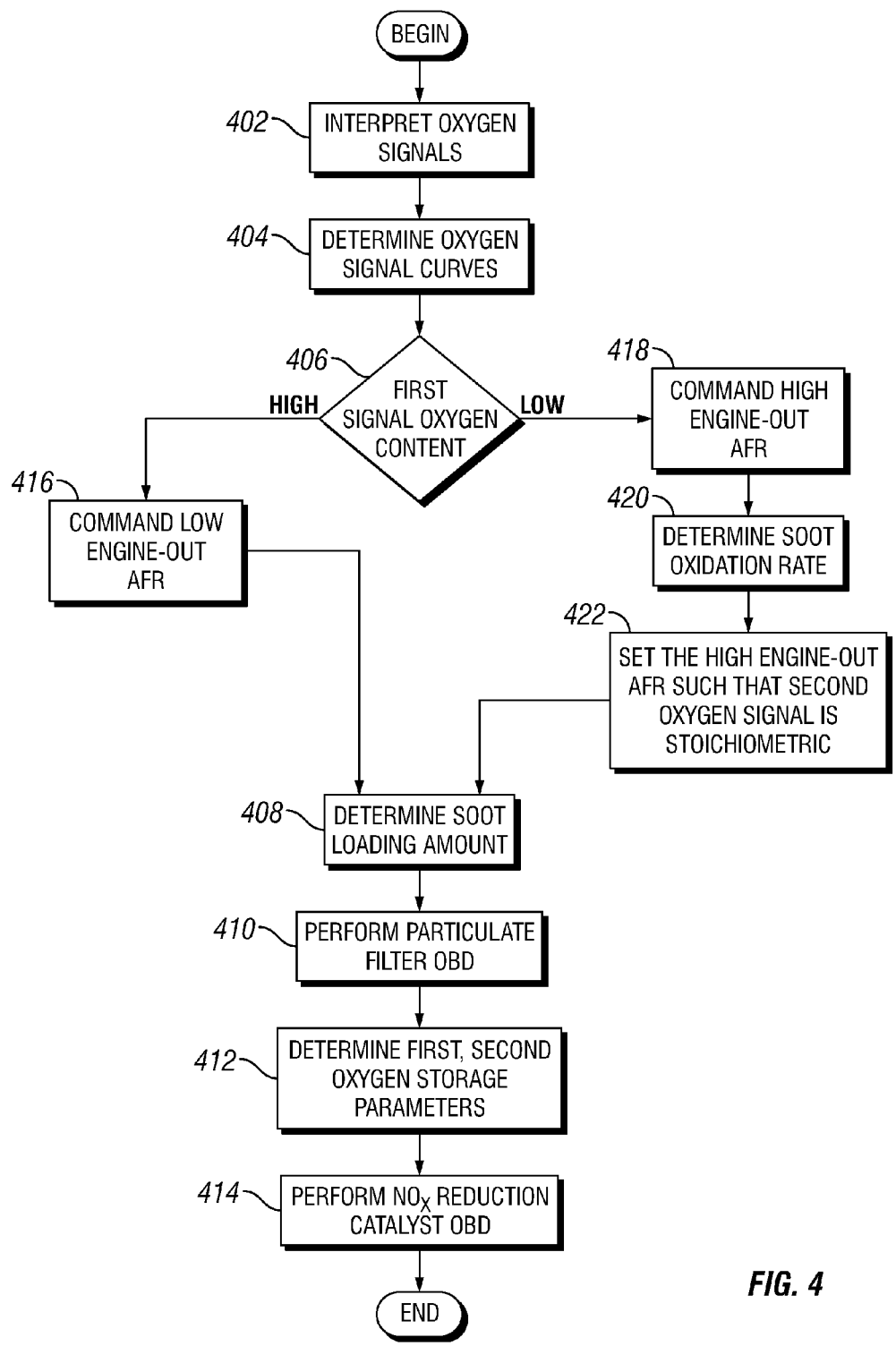
FIG. 4 is a schematic flow diagram of a procedure for operating a compression ignition engine at stoichiometric conditions.

The schematic flow diagram in FIG. 4 and related description which follows provides an illustrative embodiment of performing a procedure for operating a compression ignition engine at stoichiometric conditions. Operations illustrated are understood to be exemplary only, and operations may be combined or divided, and added or removed, as well as re-ordered in whole or part, unless stated explicitly to the contrary herein.

FIG. 4 is a schematic flow diagram of a procedure 400 for operating a compression ignition engine at stoichiometric conditions. The procedure 400 includes an operation 402 to interpret oxygen signals 310, 312, 314 from one or more oxygen sensors. The procedure 400 further includes an operation 404 to determine oxygen signal curves 202, 204, 206 from the oxygen signals 310, 312, 314. The procedure 400 includes an operation 406 to determine whether a first oxygen signal 310 indicates a high oxygen content or a low oxygen content. In response to the first oxygen signal 310 indicating a HIGH oxygen content, the procedure 400 includes an operation 416 to command a low engine-out air-fuel ratio 332. In response to the first oxygen signal 310 indicating a LOW oxygen content, the procedure 400 includes an operation 418 to command a high engine-out air-fuel ratio 330, an operation 420 to determine a soot oxidation rate 316, and an operation 422 to set the high engine-out air-fuel ratio 330 to a value such that the second oxygen signal 312 indicates a stoichiometric (or approximately stoichiometric) oxygen content.

The procedure 400 further includes an operation 408 to determine a soot loading amount, and an operation 410 to perform an OBD operation on the particulate filter 108. The procedure 400 further includes an operation 412 to determine a first oxygen storage parameter 326 and a second oxygen storage parameter 328, and an operation 414 to perform a $NO_x$ reduction catalyst OBD operation. The OBD operations include determining trip definitions, setting fault indicators, incrementing and/or decrementing fault conditions, and/or resetting fault conditions as will be understood to one of skill in the art.

The OBD operations include providing a diagnostic value in response to the performance criteria and the trip definition. For example, an ability of the particulate filter to store and oxidize $NO_x$ is determined according to the consumption of oxygen across the particulate filter during operations at a temperature, particulate loading, and oxygen concentration where oxidation is expected. Where the oxidation rate is observed to occur at a rate that is consistent with a large amount of soot on the particulate filter, the ability of the particulate filter to trap a large amount of soot is confirmed. Where significant soot oxidation is observed, the ability of the particulate filter to trap a large amount of soot is confirmed.

In another example of OBD operations, an ability of the $NO_x$ reduction catalyst to store and release oxygen is determined according to oxygen slip delay across the $NO_x$ reduction catalyst after an increase in the oxygen inlet amount to the $NO_x$ reduction catalyst. Similarly, the ability of the $NO_x$ reduction catalyst to release oxygen is determined according to continued oxygen release after a decrease in the oxygen inlet amount to the $NO_x$ reduction catalyst. The amount of oxygen storage and release can be compared to standardized or expected oxygen storage and release characteristics, confirming whether the $NO_x$ reduction catalyst is performing acceptably, performing at a reduced capacity, and/or failed.

Figure 5:
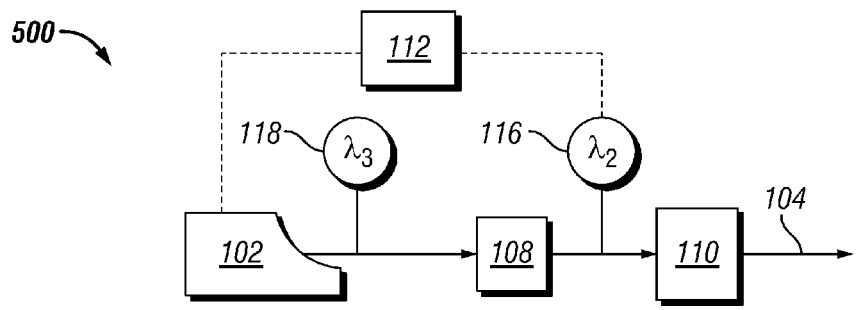
FIG. 5 is a schematic diagram of a system for control of an aftertreatment system including a particulate filter and a rich NO$_x$ conversion device.

FIG. 5 is a schematic diagram of a system 500 for control of an aftertreatment system including a particulate filter 108 and a rich $NO_x$ conversion device 110. The system 500 includes an internal combustion engine 102 that produces an exhaust gas flow 104, the particulate filter 108 disposed in the exhaust gas flow 104. The particulate filter 108 traps a portion of particulate matter (e.g. soot) flowing in the exhaust gas flow 104. The particulate matter is oxidized at a later operating time, in the presence of oxygen (or other oxidizing exhaust gas constituent) and sufficient temperature. The system 500 further includes a $NO_x$ reduction catalyst 110 disposed in the exhaust gas flow downstream of the particulate filter. The $NO_x$ reduction catalyst 110 is a rich or stoichiometric operating $NO_x$ reducing catalyst. Any NOx reduction catalyst known in the art is contemplated herein, including a lean $NO_x$ catalysts that is utilized to reduce $NO_x$ in rich or stoichiometric conditions during at least a portion of the operating conditions of the system. The engine 102 may be a compression ignition engine or a spark ignited engine. An exemplary system includes a spark-ignited engine where the $NO_x$ reduction catalyst 110 is a three-way catalyst.

The exemplary system 500 further includes a controller 112. The controller 112 includes one or more modules that functionally execute certain operations for controlling the aftertreatment system having the particulate filter 108 and the $NO_x$ reduction catalyst 110. An exemplary controller 112 includes an exhaust conditions module, a filter requirements module, a combustion control module, and in certain embodiments a particulate filter diagnostic module.

An exemplary exhaust conditions module interprets a particulate loading value for the particulate filter and a temperature of the particulate filter. An exemplary filter requirements module determines an excess oxygen amount in response to the particulate loading value and the temperature of the particulate filter. An exemplary combustion control module commands an engine-out air-fuel ratio in response to the excess oxygen amount, where the internal combustion engine is responsive to the commanded engine-out air-fuel ratio. More detailed operations of exemplary embodiment s of the controller 112 are described in the section referencing FIG. 6 following.

Figure 6:
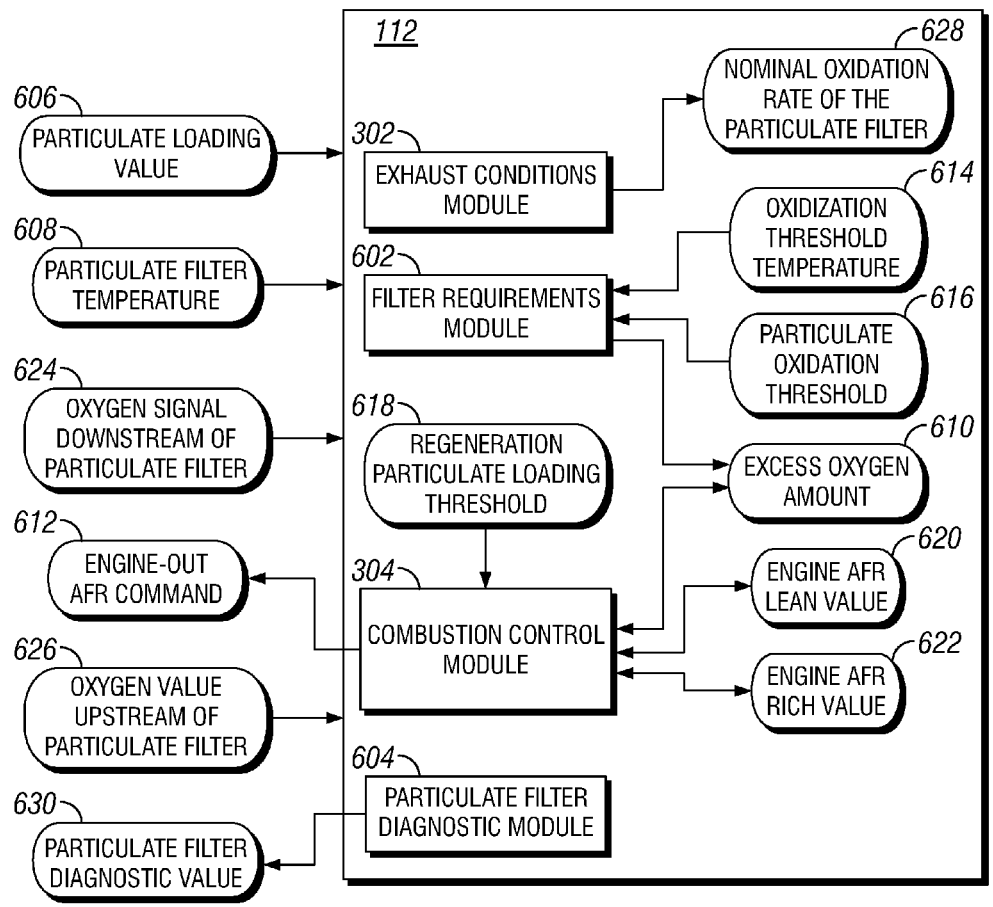
FIG. 6 is a schematic diagram of a controller that functionally executes certain operations for controlling an aftertreatment system including a particulate filter and a rich NO$_x$ conversion device.

FIG. 6 is a schematic diagram of a controller 112 that functionally executes certain operations for controlling an aftertreatment system including a particulate filter and a rich $NO_x$ conversion device. The controller 112 is consistent with one form of a controller 112 usable in system 500. The controller 112 includes an exhaust conditions module 302 that interprets a particulate loading value 606 for a particulate filter and a temperature of the particulate filter 608. The particulate loading value 606 is a parameter descriptive of an amount of soot or particulates presently on the particulate filter. Exemplary particulate loading values 606 may be quantitative—e.g. grams of soot stored on the particulate filter, and/or qualitative—e.g. an indicator of whether the particulate filter includes enough particulate matter that soot can presently be oxidized, and/or enough particulate matter that a regeneration is desired or required. The determination of a particulate loading value 606 is understood in the art, and may be made from pressure differential and flow estimations through the particulate filter 108, and/or modeling of soot accumulation and oxidation in the particulate filter 108.

The controller 112 further includes a filter requirements module 602 that determines an excess oxygen amount 610 in response to the particulate loading value 606 and the temperature of the particulate filter 608. The excess oxygen amount 610 is an amount of oxygen in the exhaust gas flow that exceeds a stoichiometric oxygen amount. The excess oxygen amount 610 is available for oxidation of soot in the particulate filter. The determination of the excess oxygen amount 610 is based upon the rate of oxidation of soot in the particulate filter, which is dependent upon the temperature of the particulate filter and the amount of soot present in the particulate filter. Higher values of the particulate loading value 606 generally indicate a higher excess oxygen amount 610, and higher particulate filter temperature 608 values generally indicate higher excess oxygen amounts 610.

In certain embodiments, the excess oxygen amount 610 is a function of the particulate loading value 606 and the particulate filter temperature 608. Additionally or alternatively, the excess oxygen amount 610 may be a fixed value, or one of several discrete values, that is selected based upon a cutoff or threshold value of the particulate loading value 606 and/or the particulate filter temperature 608.

Figure 7:
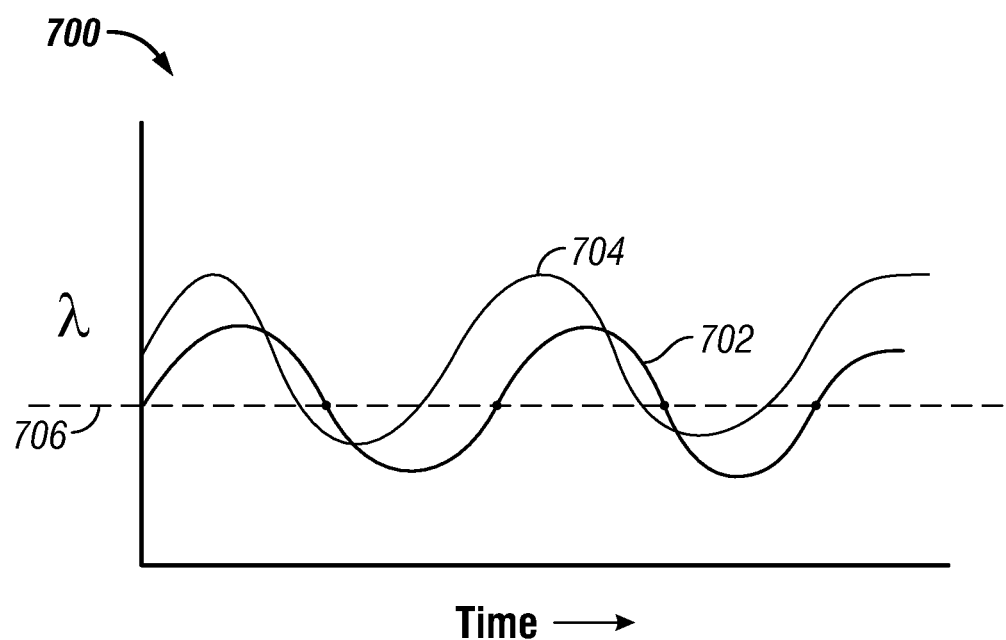
FIG. 7 depicts illustrative data showing a lambda value upstream and downstream of a particulate filter.

The controller 112 further includes a combustion control module 304 that commands an engine-out air-fuel ratio 612 in response to the excess oxygen amount 610. An internal combustion engine is responsive to the engine-out air-fuel ratio command 612. In certain embodiments, the combustion control module 304 commands the engine-out air-fuel ratio 612 in response to the excess oxygen amount by oscillating the engine-out air-fuel ratio between a lean value 620 and a rich value 622 averaged to the excess oxygen amount 610. For example, referencing FIG. 7, illustrative data 700 of a first curve 704 showing the oxygen amount (shown as a $\lambda$ value) at a position between the engine 102 and the particulate filter 108, for example as determined by an oxygen sensor 118 in FIG. 5. The curve 704 oscillates between a lean and rich condition, above and below the stoichiometric condition 706, such that averaged over time, the excess oxygen amount 610 is provided. In certain embodiments, the second curve 702 showing the oxygen amount at a position between the particulate filter 108 and the $NO_x$ reduction catalyst 110 is averaged over time to a lower oxygen amount than the first curve 704, and may be averaged to a stoichiometric condition 706.

In certain embodiments, the exhaust conditions module 302 further interprets an oxygen signal 624 from an oxygen sensor positioned downstream of the particulate filter and upstream of a $NO_x$ reduction catalyst, and the combustion control module 304 further commands the engine-out air-fuel ratio such that the oxygen signal 624 is a net stoichiometric signal. For example, the controller 112 may utilize the oxygen signal 624 as a feedback signal to trim the engine-out AFR command 612 such that the excess oxygen amount 610 is the amount of oxygen consumed across the particulate filter and the $NO_x$ reduction catalyst receives net stoichiometric conditions. The term net stoichiometric, as utilized herein, indicates that over a period of time, over a number of execution cycles, or over some other accumulating independent variable, the amount of oxygen approximates, approaches, and/or progresses toward the amount of oxygen that is required to combust hydrocarbons in the exhaust, or the amount of oxygen that produces a $\lambda$ value of 1 from a switching or wide-range oxygen sensor.

In certain embodiments, the filter requirements module 602 interprets the excess oxygen amount 610 as zero in response to the temperature of the particulate filter 608 being lower than an oxidation threshold temperature 614, and/or in response to the particulate loading value 606 for the particulate filter being lower than a particulate oxidation threshold 616. The particulate oxidation threshold 616 is an amount of particulates on the particulate filter that, at the present particulate filter temperature 608, or at an assumed default particulate filter temperature, is low enough that significant oxidation by oxygen across the particulate filter is not expected to occur. The oxidation threshold temperature 614 is a temperature of the particulate filter 608 where oxidation of particulates on the particulate filter by the oxygen-based oxidation mechanism is low enough that significant consumption of oxygen across the particulate filter is not expected to occur. Accordingly, where significant consumption of oxygen is not expected to occur, in certain embodiments, the filter requirements module 602 eliminates the excess oxygen amount 610 such that the $NO_x$ reduction catalyst does not receive a significantly lean exhaust flow due to residual oxygen.

An alternative or additional embodiment includes the filter requirements module 602 determining the excess oxygen amount 610 as a positive value in response to the temperature 608 of the particulate filter being higher than the oxidation threshold temperature 614. Yet another alternative or additional embodiment includes the filter requirements module 602 determining the excess oxygen amount 610 as a positive value in response to the particulate loading value 606 being greater than a particulate oxidation threshold 616. In certain embodiments, the filter requirements module 602 models an available rate of oxidation by oxygen across the particulate filter that occurs under the present conditions on the particulate filter, and provides the excess oxygen amount 610 based upon the available rate of oxidation, where the excess oxygen amount 610 is the available rate or a fraction thereof.

An exemplary controller 112 includes the combustion control module 304 commanding the engine-out air-fuel ratio 612 to a net stoichiometric engine-out air-fuel ratio in response to the particulate loading value 606 being lower than a regeneration particulate loading threshold 618. For example, although the combination of the particulates available on the particulate filter and the temperature 608 of the particulate filter may be sufficiently high to produce some oxidation by oxygen, the overall soot loading on the particulate filter may be low enough that consumption of soot at the present time is not required or desired. Accordingly, the combustion control module 304 provides a net stoichiometric engine-out air-fuel ratio instead of the net excess oxygen amount 610. Additionally or alternatively, the combustion control module 304 commands the engine-out air-fuel ratio 612 as a net lean engine-out air-fuel ratio in response to the particulate loading value 606 being greater than the regeneration particulate loading threshold 618.

In one form, the controller 112 includes the exhaust conditions module 302 determining a nominal oxidation rate 628 of the particulate filter in response to the particulate loading value 606 and the temperature 608 of the particulate filter. The nominal oxidation rate 628 of the particulate filter is the rate of oxidation by the oxygen mechanism (e.g. not including oxidation of soot by $NO_2$). The nominal oxidation rate 628 may be determined from a model and/or determined according to an empirically determined rate based upon the present operating conditions of the engine and aftertreatment system. The controller 112 further includes a particulate filter diagnostic module 604 that determines a particulate filter diagnostic value 630 in response to the nominal oxidation rate 628, the oxygen signal 624 from the oxygen sensor, and an oxygen value 626 at a position upstream of the particulate filter.

The oxygen value 626 describes an amount of oxygen in the exhaust gas flow upstream of the particulate filter, and may be measured by a sensor 118, and/or determined according to an engine-out $NO_x$ map. In certain embodiments, the nominal oxidation rate 628 and the engine-out $NO_x$ may be known at only a few operating conditions, and the particulate filter diagnostic module 604 determines the particulate filter diagnostic value 630 only at those few operating conditions. In certain embodiments, the nominal oxidation rate 628 and/or engine-out $NO_x$ models may be highly reliable only in a range of operating conditions, and the particulate filter diagnostic module 604 determines the particulate filter diagnostic value 630 only within that reliable range of operating conditions.

The particulate filter diagnostic value 630 is a quantitative or qualitative description of the oxidation performance of the particulate filter relative to the nominal oxidation rate 628 of the particulate filter. The particulate filter diagnostic value 630 may be a percentage of the expected oxidation rate, a description (e.g. PASS, FAIL, SUSPECT) of the performance of the particulate filter, a fault counter that increments and decrements based upon the performance of the particulate filter relative to the nominal oxidation rate 628 of the particulate filter, or other fault handling parameter understood in the art. The particulate filter diagnostic module 604 may operate once per vehicle trip, engine operating cycle, or according to some other schedule, and may be a part of a system diagnostic or an OBD process.

The schematic flow descriptions which follow provide an illustrative embodiment of performing a procedure for controlling an aftertreatment system having a particulate filter and a $NO_x$ reduction catalyst. Operations illustrated are understood to be exemplary only, and operations may be combined or divided, and added or removed, as well as re-ordered in whole or part, unless stated explicitly to the contrary herein.

An exemplary procedure includes an operation to determine a particulate loading value and a temperature for a particulate filter, and in response to the particulate loading value and the temperature for the particulate filter, an operation to determine an excess oxygen amount. The procedure further includes, in response to the excess oxygen amount, commanding an engine-out air-fuel ratio for an engine. The exemplary procedure further includes determining the excess oxygen amount by determining an excess oxygen amount such that an exhaust gas flow downstream of the particulate filter is at stoichiometric conditions. The stoichiometric conditions, in one form, are time-averaged stoichiometric conditions and/or net stoichiometric conditions. An exemplary procedure further includes an operation to determine whether particulate filter regeneration conditions are present, and an operation to determine the excess oxygen amount to be zero in response to the particulate filter regeneration conditions not being present.

In certain embodiments, the procedure includes an operation to determine whether particulate filter regeneration conditions are present by determining that the particulate loading value is below a particulate oxidation threshold, and/or by determining that the temperature for the particulate filter is below an oxidation threshold temperature. The operation to command the engine-out air-fuel ratio includes, in one form, oscillating the engine-out air-fuel ratio between a lean value and a rich value averaged to the excess oxygen amount.

As is evident from the figures and text presented above, a variety of embodiments according to the present invention are contemplated.

One exemplary embodiment is a system including a compression ignition engine producing an exhaust gas flow, a particulate filter disposed in the exhaust gas flow, a $NO_x$ reduction catalyst disposed in the exhaust gas flow downstream of the particulate filter, a first oxygen sensor operationally coupled to the exhaust gas flow downstream of the $NO_x$ reduction catalyst, a second oxygen sensor operationally coupled to the exhaust gas flow between the particulate filter and the $NO_x$ reduction catalyst, and a controller having modules structured to functionally execute a procedure for operating a compression ignition engine at a stoichiometric condition. The controller includes an exhaust conditions module and a combustion control module. In certain embodiments, the controller further includes a soot oxidation estimation module and a diagnosis module.

The exhaust conditions module interprets a first oxygen signal from the first oxygen sensor and a second oxygen signal from the second oxygen sensor. The combustion control module commands a high engine-out air-fuel ratio in response to the first oxygen signal indicating a low oxygen content out of the NOx reduction catalyst and commands a low engine-out air-fuel ratio in response to the first oxygen signal indicating a high oxygen content out of the $NO_x$ reduction catalyst.

The high engine-out air-fuel ratio can include any value over a stoichiometric value, and in certain embodiments includes a lambda value between 1.02 and 1.15. In certain embodiments, the high engine-out oxygen fraction includes an oxygen fraction between 0.25% and 9% in the post-combustion exhaust stream. In certain embodiments, the combustion control module commands the high engine-out air-fuel ratio by controlling a combustion air-fuel ratio to a value between about 14.9 to about 16.3, and/or to a value between about 14.9 to about 18.

The low engine-out air-fuel ratio can include any value below a stoichiometric value, and in certain embodiments includes a lambda value below about 0.99 or below about 0.98. In certain embodiments, the combustion control module commands the low engine-out air-fuel ratio by controlling a combustion air-fuel ratio to a value between about 13.9 to about 14.7, and/or to a value between about 14.4 to about 14.7.

Certain exemplary embodiments of the system include a third oxygen sensor operationally coupled to the exhaust gas flow upstream of the particulate filter, and the exhaust conditions module interprets a third oxygen signal from the third oxygen sensor. The combustion control module is further structured to utilize the third oxygen signal as a feedback parameter for the engine-out air-fuel ratio. In one example, the combustion control module utilizes a feedforward model to estimate combustion conditions required to achieve the target engine-out air-fuel ratio, and trims the combustion conditions by determining an error value between the measured engine-out air-fuel ratio and the target engine-out air-fuel ratio.

The combustion control module may further command the high engine-out air-fuel ratio in response to the first oxygen signal switching to indicating a low oxygen content out of the $NO_x$ reduction catalyst, and command the low engine-out air-fuel ratio in response to the first oxygen signal switching to indicating a high oxygen content out of the $NO_x$ reduction catalyst. In certain embodiments, the combustion control module further waits a first predetermined period of time before commanding the high engine-out air-fuel ratio after the first oxygen signal switches to indicating a low oxygen content out of the $NO_x$ reduction catalyst, and waits a second predetermined period of time before commanding the low engine-out air-fuel ratio after the first oxygen signal switches to indicating a high oxygen content out of the $NO_x$ reduction catalyst.

In certain embodiments, the combustion control module commands the low engine-out air-fuel ratio by commanding a combustion air-fuel ratio with less than or equal to a stoichiometric amount of oxygen, and/or commands the high engine-out air-fuel ratio by commanding a combustion air-fuel ratio with greater than a stoichiometric amount of oxygen. The exemplary combustion control module commands the high engine-out air-fuel ratio by commanding the combustion air-fuel ratio such that the exhaust flow upstream of the particulate filter includes an excess amount of oxygen and the exhaust flow downstream of the particulate filter is about at a stoichiometric ratio of oxygen. The system further includes a soot oxidation estimation module that determines a soot oxidation rate in the particulate filter, and the combustion control module commands the combustion air-fuel ratio in response to the soot oxidation rate.

The exemplary system includes a diagnosis module that determines a soot loading amount on the particulate filter in response to a difference between the third oxygen signal and the second oxygen signal and/or in response to an area between a third oxygen signal curve and a second oxygen signal curve. The diagnosis module further determines a first oxygen storage parameter in response to an area between a second oxygen signal curve and a first oxygen signal curve during a period where the combustion control module is commanding the high engine-out air-fuel ratio, and determines a second oxygen storage parameter in response to an area between a first oxygen signal curve and a second oxygen signal curve during a period where the combustion control module is commanding the low engine-out air-fuel ratio. In certain embodiments, the diagnosis module further performs an on-board diagnostic routine for the particulate filter and/or for the $NO_x$ reduction catalyst.

Another exemplary embodiment is a method including operating a compression ignition engine at stoichiometric combustion conditions, and monitoring the oxygen content of exhaust gases at various locations in the exhaust stream. The exhaust gases may be monitored with oxygen sensors, including switching lambda sensors, wide-range lambda sensors, oxygen sensors, and/or $NO_x$ sensors that are also capable of providing oxygen information. The method includes determining the oxygen content (or air-fuel ratio) at a position downstream of a $NO_x$ reduction catalyst with a first oxygen sensor and determining the oxygen content and/or air-fuel ratio at a position downstream of a particulate filter and upstream of the $NO_x$ reduction catalyst with a second oxygen sensor. The method further includes determining the oxygen content (or air-fuel ratio) at a position upstream of the particulate filter, either with a third oxygen sensor and/or with a virtual calculation of the engine out conditions.

The method further includes providing stoichiometric conditions at the $NO_x$ reduction catalyst while providing excess oxygen at the particulate filter to oxidize soot stored on the particulate filter. In certain embodiments, the method includes determining an oxidation rate of soot in the particulate filter, and providing excess oxygen such that the remaining oxygen out of the particulate filter leaves the exhaust gas entering the $NO_x$ reduction catalyst at about stoichiometric conditions. In certain embodiments, the method includes switching the combustion to a high engine-out air-fuel ratio in response to the oxygen content downstream of the $NO_x$ reduction catalyst indicating a low value. The method can further include switching the combustion to a low engine-out air-fuel ratio in response to the oxygen content downstream of the $NO_x$ reduction catalyst indicating a high value.

The method further includes determining a soot oxidation rate and/or an amount of soot stored on the particulate filter. The soot oxidation rate and the soot stored on the particulate filter may be determined according to an air-fuel ratio upstream of the particulate filter compared to an air-fuel ratio downstream of the particulate filter. The comparison may include determining an area between a curve of the air-fuel ratio upstream of the particulate filter and the air-fuel ratio downstream of the particulate filter, plotted or integrated against an independent variable such as time. The comparison may include determining an average distance between the curves, a maximum distance between the curves, or any other meaningful statistical comparison between the curves.

The method further includes determining an oxygen storage capacity of the $NO_x$ reduction catalyst. The oxygen storage capacity may be determined according to an air-fuel ratio upstream of the $NO_x$ reduction catalyst compared to an air-fuel ratio downstream of the $NO_x$ reduction catalyst. The comparison may include determining an area between a curve of the air-fuel ratio upstream of the $NO_x$ reduction catalyst and the air-fuel ratio downstream of the $NO_x$ reduction catalyst, plotted or integrated against an independent variable such as time. The comparison may include determining an average distance between the curves, a maximum distance between the curves, or any other meaningful statistical comparison between the curves.

In another embodiment, the method includes controlling a soot oxidation rate on the particulate filter by determining a difference in the oxygen concentration and/or lambda upstream of the particulate filter and downstream of the particulate filter. The soot oxidation rate is reduced if the oxygen concentration or lambda difference is too great by reducing the engine-out air-fuel ratio, and the soot oxidation rate is increased if the oxygen concentration or lambda difference is too small.

In certain embodiments, the method includes performing an onboard diagnostic (OBD) check on the particulate filter and/or the $NO_x$ reduction catalyst. The OBD check includes defining a trip event, checking the particulate filter and/or $NO_x$ reduction catalyst against performance criteria, incrementing, decrementing, and/or setting fault values and criteria, and any other OBD operations known in the art, required by law, or available based upon the descriptions herein. In certain embodiments, performance criteria include the ability of the particulate filter to trap and support oxidation of soot from the exhaust stream, and/or the ability of the $NO_x$ reduction catalyst to store and release oxygen.

The operations of the method may be executed by a computer program product stored on a computer readable medium having coded instructions that, when executed by a computer, cause the computer to perform one or more functions of the method. Some functions of the method may be performed in software or hardware. The computer program product may be stored on a single computer readable medium or may be distributed across multiple computers, which may be in communication via datalinks, networks, and/or wireless communications.

Yet another exemplary set of embodiments is a system including an internal combustion engine that produces an exhaust gas flow, a particulate filter disposed in the exhaust gas flow, and a $NO_x$ reduction catalyst disposed in the exhaust gas flow downstream of the particulate filter. The engine may be a compression ignition engine or a spark ignited engine. An exemplary system includes a spark-ignited engine where the $NO_x$ reduction catalyst is a three-way catalyst.

The exemplary system further includes a controller, the controller having an exhaust conditions module, a filter requirements module, a combustion control module, and in certain embodiments a particulate filter diagnostic module. An exemplary exhaust conditions module interprets a particulate loading value for the particulate filter and a temperature of the particulate filter. An exemplary filter requirements module determines an excess oxygen amount in response to the particulate loading value and the temperature of the particulate filter. An exemplary combustion control module commands an engine-out air-fuel ratio in response to the excess oxygen amount, where the internal combustion engine is responsive to the commanded engine-out air-fuel ratio.

In certain embodiments, the filter requirements module interprets the excess oxygen amount as zero in response to the temperature of the particulate filter being lower than an oxidation threshold temperature, and/or in response to the particulate loading value for the particulate filter being lower than a particulate oxidation threshold. Certain further embodiments include the combustion control module commanding the engine-out air-fuel ratio in response to the excess oxygen amount by oscillating the engine-out air-fuel ratio between a lean value and a rich value averaged to the excess oxygen amount.

An exemplary system further includes the filter requirements module determining the excess oxygen amount as zero in response to the temperature of the particulate filter being lower than an oxidation threshold temperature, and/or the particulate loading value for the particulate filter being lower than a particulate oxidation threshold. An alternative or additional embodiment includes the filter requirements module determining the excess oxygen amount as a positive value in response to the temperature of the particulate filter being higher than the oxidation threshold temperature. Yet another alternative or additional embodiment includes the filter requirements module determining the excess oxygen amount as a positive value in response to the particulate loading value being greater than a particulate oxidation threshold.

Another exemplary system includes the combustion control module commanding the engine-out air-fuel ratio to a net stoichiometric engine-out air-fuel ratio in response to the particulate loading value being lower than a regeneration particulate loading threshold. Additionally or alternatively, the combustion control module commands the engine-out air-fuel ratio as a net lean engine-out air-fuel ratio in response to the particulate loading value being greater than the regeneration particulate loading threshold.

A still further embodiment includes the combustion control module commanding the engine-out air-fuel ratio such that an oxygen signal from an oxygen sensor positioned between the particulate filter and the $NO_x$ reduction catalyst is a net stoichiometric signal in response to the particulate loading value being greater than a regeneration particulate loading threshold. Additionally or alternatively, the exhaust conditions module determines a nominal oxidation rate of the particulate filter in response to the particulate loading value and the temperature of the particulate filter. The exemplary system further includes a particulate filter diagnostic module that determines a particulate filter diagnostic value in response to the nominal oxidation rate, the oxygen signal from the oxygen sensor, and an oxygen amount at a position upstream of the particulate filter.

Another exemplary set of embodiments is a method, including determining a particulate loading value and a temperature for a particulate filter, and in response to the particulate loading value and the temperature for the particulate filter, determining an excess oxygen amount. The method further includes, in response to the excess oxygen amount, commanding an engine-out air-fuel ratio for an engine.

Additional or alternative operations of the method are described as follows. An exemplary method includes determining the excess oxygen amount by determining an excess oxygen amount such that an exhaust gas flow downstream of the particulate filter is at stoichiometric conditions. The stoichiometric conditions, in one form, are time-averaged stoichiometric conditions. An exemplary method further includes determining whether particulate filter regeneration conditions are present, and determining the excess oxygen amount to be zero in response to the particulate filter regeneration conditions not being present.

In certain embodiments, the method includes determining whether particulate filter regeneration conditions by determining that the particulate loading value is below a particulate oxidation threshold, and/or by determining that the temperature for the particulate filter is below an oxidation threshold temperature. The operation to command the engine-out air-fuel ratio includes, in one form, oscillating the engine-out air-fuel ratio between a lean value and a rich value averaged to the excess oxygen amount.

Yet another exemplary set of embodiments is an apparatus, including an exhaust conditions module that interprets a particulate loading value for a particulate filter and a temperature of the particulate filter, a filter requirements module that determines an excess oxygen amount in response to the particulate loading value and the temperature of the particulate filter, and a combustion control module that commands an engine-out air-fuel ratio in response to the excess oxygen amount. In certain embodiments, the filter requirements module interprets the excess oxygen amount as zero in response to one of the temperature of the particulate filter being lower than an oxidation threshold temperature and the particulate loading value for the particulate filter being lower than a particulate oxidation threshold.

In certain embodiments, the combustion control module commands the engine-out air-fuel ratio in response to the excess oxygen amount by oscillating the engine-out air-fuel ratio between a lean value and a rich value averaged to the excess oxygen amount. An exemplary apparatus includes the exhaust conditions module further interpreting an oxygen signal from an oxygen sensor positioned downstream of the particulate filter and upstream of a $NO_x$ reduction catalyst, where the combustion control module further commands the engine-out air-fuel ratio such that the oxygen signal is a net stoichiometric signal.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining an a first oxygen content in an exhaust stream at a position downstream of a $NO_x$ reduction catalyst with a first oxygen sensor;
   determining a second oxygen content in the exhaust stream at a position downstream of a diesel particulate filter and upstream of the $NO_x$ reduction catalyst with a second oxygen sensor; and
   operating a compression ignition internal combustion engine in response to the first oxygen content and the second oxygen content, wherein the operating is performed to provide stoichiometric conditions for the second oxygen content and excess oxygen at the first oxygen content;
   determining a third oxygen content at a position upstream of the particulate filter with one of a third oxygen sensor and a virtual calculation of an engine-out air-fuel ration;
   determining at least one of a soot oxidation rate and an amount of soot stored on the particulate filter according to the third oxygen content compared to the second oxygen content,
   wherein determining the at least one of the soot oxidation rate and the amount of soot stored on the particulate filter comprises determining an area between a curve of third oxygen content and a curve of the second oxygen content, and performing one of plotting and integrating the area against an independent variable; and
   performing an onboard diagnostic (OBD) check on the particulate filter, wherein the performing the OBD check comprises checking the particulate filter against performance criteria, wherein the performance criteria includes an ability of the particulate filter to trap and oxidize soot, and providing a diagnostic value in response to the performance criteria.

2. The method of claim 1, wherein the first oxygen sensor comprises an oxygen sensor, a switching lambda sensor, a wide-range lambda sensor, and/or a $NO_x$ sensor capable of providing oxygen information.

3. The method of claim 1, further comprising switching the combustion to a high engine-out air-fuel ratio in response to the first oxygen content indicating a low value.

4. The method of claim 1, further comprising switching the combustion to a low engine-out air-fuel ratio in response to the first oxygen content indicating a high value.

5. A method comprising:
   determining a first oxygen content in an exhaust stream at a position downstream of a $NO_x$ reduction catalyst with a first oxygen sensor;
   determining a second oxygen content in the exhaust stream at a position downstream of a particulate filter and upstream of the NO reduction catalyst with a second oxygen sensor;
   operating an internal combustion engine in response to the first oxygen content and the second oxygen content, wherein the operating is performed to provide stoichiometric conditions for the second oxygen content and excess oxygen at the first oxygen content;
   determining a third oxygen content at a position upstream of the particulate filter with one of a third oxygen sensor and a virtual calculation of an engine-out air-fuel ratio; and
   determining at least one of a soot oxidation rate and an amount of soot stored on the particulate filter according to the third oxygen content compared to the second oxygen content,
   wherein determining the at least one of the soot oxidation rate and the amount of soot stored on the particulate filter comprises determining an area between a curve of third oxygen content and a curve of the second oxygen content, and performing one of plotting and integrating the area against an independent variable.

6. The method of claim 5, wherein the first oxygen sensor comprises an oxygen sensor, a switching lambda sensor, a wide-range lambda sensor, and/or a $NO_x$ sensor capable of providing oxygen information.

7. A method, comprising:
   determining a first oxygen content in an exhaust stream at a position downstream of a $NO_x$ reduction catalyst with a first oxygen sensor;
   determining a second oxygen content in the exhaust stream at a position downstream of a particulate filter and upstream of the NO reduction catalyst with a second oxygen sensor;
   operating an internal combustion engine in response to the first oxygen content and the second oxygen content, wherein the operating is performed to provide stoichiometric conditions for the second oxygen content and excess oxygen at the first oxygen content;
   determining a third oxygen content at a position upstream of the particulate filter with one of a third oxygen sensor and a virtual calculation of an engine-out air-fuel ratio: and
   determining at least one of a soot oxidation rate and an amount of soot stored on the particulate filter according to the third oxygen content compared to the second oxygen content,
   wherein determining the at least one of the soot oxidation rate and the amount of soot stored on the particulate filter comprises determining at least one parameter selected from the parameters consisting of an average distance between a curve of the third oxygen content and a curve of the second oxygen content, a maximum distance between a curve of the third oxygen content and a curve of the second oxygen content, and a meaningful statistical comparison between a curve of the third oxygen content and a curve of the second oxygen content.

8. The method of claim 7, wherein the first oxygen sensor comprises an oxygen sensor, a switching lambda sensor, a wide-range lambda sensor, and/or a $NO_x$ sensor capable of providing oxygen information.

9. A method, comprising:
   determining a first oxygen content in an exhaust stream at a position downstream of a $NO_x$ reduction catalyst with a first oxygen sensor;

determining a second oxygen content in the exhaust stream at a position downstream of a particulate filter and upstream of the NO reduction catalyst with a second oxygen sensor;

operating an internal combustion engine in response to the first oxygen content and the second oxygen content, wherein the operating is perfomied to provide stoichiometric conditions for the second oxygen content and excess oxygen at the first oxygen content;

determining a third oxygen content at a position upstream of the particulate filter with one of a third oxygen sensor and a virtual calculation of an engine-out air-fuel ratio; and determining a difference between the second oxygen content and the third oxygen content, and controlling a soot oxidation rate on the particulate filter by reducing the soot oxidation rate in response to the difference between the second oxygen content and the third oxygen content being greater than a high oxidation rate threshold, and increasing the soot oxidation rate in response to the difference between the second oxygen content and the third oxygen content being less than a low oxidation rate threshold.

10. The method of claim 9, wherein the first oxygen sensor comprises an oxygen sensor, a switching lambda sensor, a wide-range lambda sensor, and/or a $NO_x$ sensor capable of providing oxygen information.

11. A method, comprising:

determining a first oxygen content in an exhaust stream at a position downstream of a $NO_x$ reduction catalyst with a first oxygen sensor;

determining a second oxygen content in the exhaust stream at a position downstream of a diesel particulate filter and upstream of the $NO_x$ reduction catalyst with a second oxygen sensor;

operating a compression ignition internal combustion engine in response to the first oxygen content and the second oxygen content, wherein the operating is performed to provide stoichiometric conditions for the second oxygen content and excess oxygen at the first oxygen content; and determining a third oxygen content at a position upstream of the particulate filter with one of a third oxygen sensor and a virtual calculation of an engine-out air-fuel ratio;

determining at least one of a soot oxidation rate and an amount of soot stored on the particulate filter according to the third oxygen content compared to the second oxygen content, wherein determining the at least one of the soot oxidation rate and the amount of soot stored on the particulate filter comprises determining an area between a curve of third oxygen content and a curve of the second oxygen content, and performing one of plotting and integrating the area against an independent variable; and performing an onboard diagnostic (OBD) check on the $NO_x$ reduction catalyst, wherein the performing the OBD check comprises checking the $NO_x$ reduction catalyst against performance criteria, wherein the performance criteria includes an ability of the $NO_x$ reduction catalyst to store and release oxygen, and providing a diagnostic value in response to the performance criteria.

12. The method of claim 11, wherein the first oxygen sensor comprises an oxygen sensor, a switching lambda sensor, a wide-range lambda sensor, and/or a $NO_x$ sensor capable of providing oxygen information.

* * * * *